No. 867,144. PATENTED SEPT. 24, 1907.
E. LEE.
BRAKE SHOE FOR LOCOMOTIVES.
APPLICATION FILED JAN. 19, 1907.
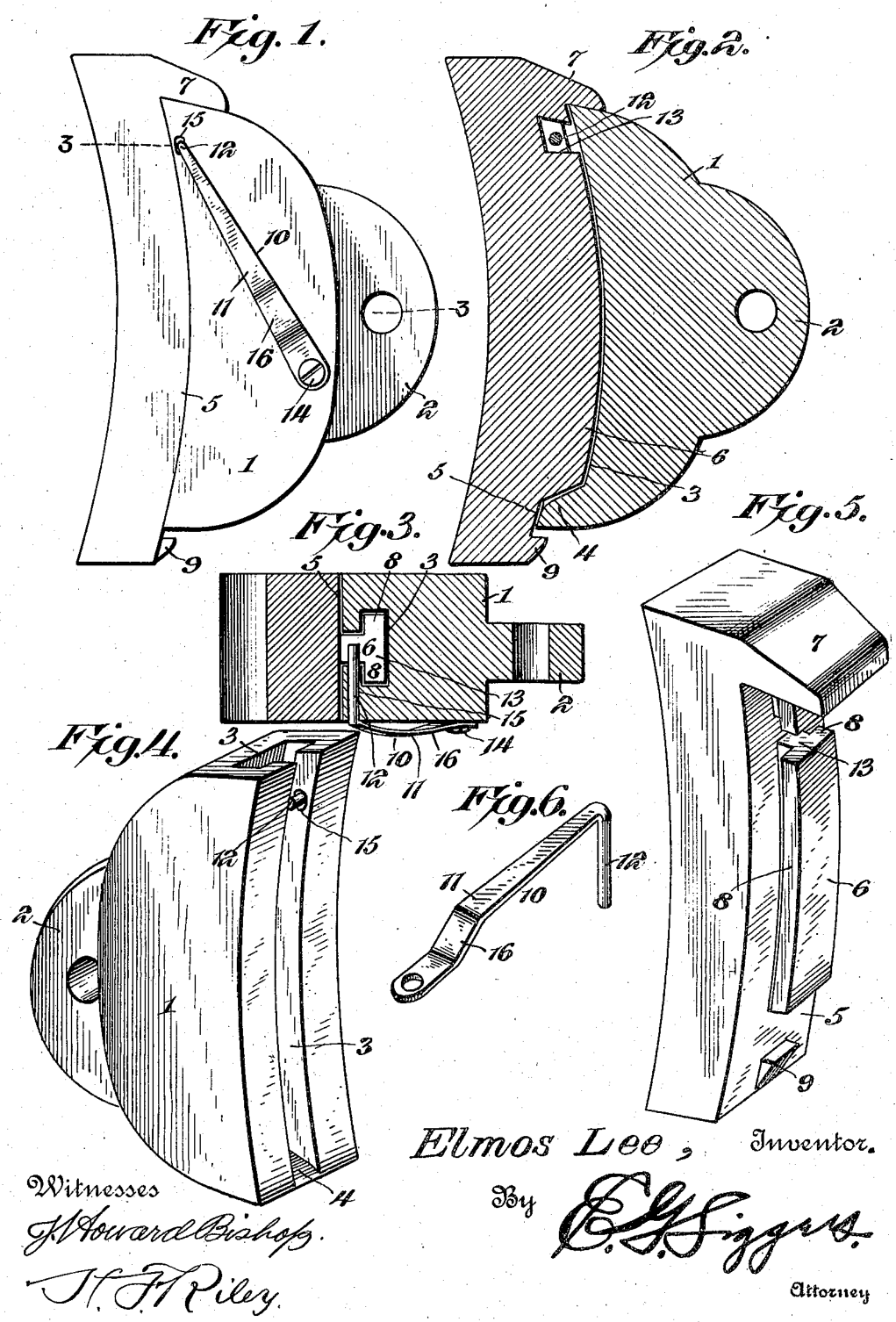
Elmos Lee, Inventor.
Witnesses

UNITED STATES PATENT OFFICE.

ELMOS LEE, OF PADUCAH, KENTUCKY.

BRAKE-SHOE FOR LOCOMOTIVES.

No. 867,144.

Specification of Letters Patent.

Patented Sept. 24, 1907.

Application filed January 19, 1907. Serial No. 353,093.

*To all whom it may concern:*

Be it known that I, ELMOS LEE, a citizen of the United States, residing at Paducah, in the county of McCracken and State of Kentucky, have invented a new and useful Brake-Shoe for Locomotives, of which the following is a specification.

The invention relates to improvements in brake shoes for locomotives.

The object of the present invention is to improve the construction of brake shoes for locomotives, and to provide an exceedingly simple and inexpensive brake shoe having fastening means adapted to hold the brake shoe on a brake head until the said shoe is entirely worn out.

A further object of the invention is to provide a brake shoe having fastening means adapted to effectually prevent the brake shoe from shaking off the brake head and becoming lost, and capable of enabling the said shoe to be instantly removed from the brake head and of being easily and quickly replaced thereon.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a locomotive brake shoe, constructed in accordance with this invention and shown applied to a brake head. Fig. 2 is a vertical longitudinal sectional view. Fig. 3 is a horizontal sectional view, taken substantially on the line 3—3 of Fig. 1. Fig. 4 is a perspective view of the brake head. Fig. 5 is a similar view of the brake shoe. Fig. 6 is a perspective view of the spring catch.

Like numerals of reference designate corresponding parts in all the figures of the drawing.

1 designates a locomotive brake head having an attaching lug or ear 2 at the back, and provided at its front face with a groove 3, T-shaped in cross section and extending along the brake head from the upper end thereof to within a short distance of the lower end of the same, the groove being closed at the bottom by an end wall 4. The front faces of the brake head at opposite sides of the longitudinal groove 3 are concavely curved to fit the rear face 5 of the brake shoe, which is provided at its rear face with a longitudinal tongue 6. The tongue 6, which is T-shaped in cross section, as clearly illustrated in Figs. 3 and 5 of the drawing, fits within the groove of the brake head, and the brake shoe is provided at the top with a rearwardly projecting portion or enlargement 7, which extends over the top of the brake head for supporting the brake shoe thereon.

The laterally extending flanges 8 of the tongue 6 are of a thickness somewhat less than the corresponding width of the laterally extending portions of the groove of the brake head to permit the lower end of the brake shoe to be moved forwardly or outwardly from the brake head to carry a bottom lug 9 out of engagement with the said brake head. When the brake shoe is in place on the brake head, as illustrated in Figs. 1 and 2 of the drawing, the lug 9 projects rearwardly from the lower end of the brake shoe and extends beneath the lower end of the brake head, and it is adapted to prevent the brake shoe from shaking off the brake head and it also relieves a spring catch 10 of strain.

The spring catch, which positively locks the brake shoe on the brake head, consists of a resilient shank 11 and a transverse engaging portion 12, which extends through one side of the brake head and which is arranged within a transverse recess 13 of the tongue 6. The spring catch, which may be constructed of any suitable resilient material, is secured to the brake head by means of a screw 14, or other suitable fastening device, and the resilient shank extends upwardly and forwardly from the screw 14 to a transverse opening 15 of the brake head. The opening 15 extends through one side of the brake head and communicates with the longitudinal groove of the same. The transverse portion 12 of the spring catch is rounded, and the transverse recess 13 of the tongue 6 forms a lower shoulder for preventing the brake shoe from sliding upwardly off the brake head.

The resilient catch is provided a short distance from the screw 14 with an outward bend 16, which off-sets the body portion of the resilient shank from the brake head a sufficient distance to permit an instrument to be readily introduced between the shank and the brake head for withdrawing the transversely disposed portion 12 of the catch from engagement with the brake shoe. When the transverse portion 12 of the catch is withdrawn from the recess 13 of the tongue 6, the brake shoe may be readily lifted off the brake head, the lower end of the brake shoe being drawn forwardly or outwardly to carry the lug 9 beyond the lower face of the brake head.

It will be seen that the brake shoe is exceedingly simple and inexpensive in construction, and that, when applied to the brake head, it is securely interlocked therewith, and effectually prevented from shaking off the brake head and becoming lost. Also it will be clear that the means for securing the brake shoe to the brake head are adapted to retain the brake shoe on the brake head until the former is entirely worn out, and that such means will enable the brake shoe to be instantly removed from and easily and quickly replaced on the brake head.

Having thus fully described my invention, what I claim as new and desire to secure by Letters Patent, is:—

1. A brake head provided at the front with a longitudinal recess, and a brake-shoe having a longitudinal tongue fitting in the recess and interlocking the brake shoe with the brake head, said brake shoe being provided at the top with a rearwardly extending projection or enlargement engaging the upper edge of the brake head.

2. The combination of a brake head provided with a longitudinal recess closed at the bottom, and a brake shoe provided with a longitudinal tongue fitting in the recess and interlocking the brake shoe with the brake head, said brake shoe being also provided at the top with a rearwardly extending projection engaging the upper edge of the brake head.

3. The combination of a brake head provided with a groove approximately T-shaped in cross section, a brake shoe having a tongue substantially T-shaped in cross section and arranged in the groove of the brake head to interlock the brake shoe with the same, means for supporting the brake shoe in its interlocked relation, and a lug projecting from the lower end of the brake shoe and arranged to engage the brake head to hold the brake shoe against upward movement, said brake shoe being capable of a limited outward movement to carry the lug out of engagement with the brake head.

4. The combination of a brake head provided with a longitudinal groove, a brake shoe having a tongue arranged in the groove of the brake head to interlock the brake shoe with the same, means for supporting the brake shoe in its interlocked relation, a lug projecting from the lower end of the brake shoe and arranged to engage the brake head to hold the brake shoe against upward movement, said brake shoe being capable of a limited outward movement to carry the lug out of engagement with the brake head, and an exteriorly arranged catch having an engaging portion piercing the brake head and the brake shoe and locking the latter against outward movement to retain the lug in engagement with the brake head.

5. The combination of a brake head provided with a groove, a brake shoe having a tongue to fit in the groove and provided at the top with a rearwardly projecting portion engaging the upper edge of the brake head, and a lug extending from the lower end of the brake shoe and engaging the lower edge of the brake head.

6. The combination of a brake head, a brake shoe slidably interlocked therewith, and a resilient catch consisting of a resilient shank, and a transverse engaging portion securing the brake shoe and the brake head in their interlocked relation.

7. The combination of a brake head having a groove, a brake shoe provided with a tongue fitting in the groove and slidably interlocking the brake shoe with the brake head, said tongue having a transverse recess, and a catch mounted on the exterior of the brake head and having an engaging portion piercing one of the walls of the groove and extending into the recess of the tongue.

8. The combination of a brake head having a groove, a brake shoe provided with a tongue slidably interlocked with the groove, said brake shoe being also provided at the top with a projecting portion to engage the upper edge of the brake head and having a lug at its lower end to engage the lower edge of the said brake head, and a catch mounted on the brake head and having means for engaging the tongue of the brake shoe.

In testimony, that I claim the foregoing as my own, I have hereto affixed my signature in the presence of two witnesses.

ELMOS LEE.

Witnesses:
M. A. WATTS,
ANDREW PATTEN.